United States Patent
Lie et al.

(10) Patent No.: US 7,499,729 B2
(45) Date of Patent: Mar. 3, 2009

(54) APPARATUS TO PROVIDE SIGNAL LINK BETWEEN MOBILE PHONE AND LANDLINE HOUSE TELEPHONE FOR VOICE COMMUNICATION

(76) Inventors: Kun-Ho Lie, 2430 W. Mulberry Dr., Chandler, AZ (US) 85248; Tahte Shih, 3F, No-25-2 Ln 51, Dai-An Rd., Sec. 1, Taipei (TW); Chin-Kun Lay, 8680 E. Thoroughbred Trail, Scottsdale, AZ (US) 85258

( * ) Notice: Subject to any disclaimer, the term of this patent is extended or adjusted under 35 U.S.C. 154(b) by 665 days.

(21) Appl. No.: 10/992,326

(22) Filed: Nov. 19, 2004

(65) Prior Publication Data

US 2006/0111151 A1     May 25, 2006

(51) Int. Cl.
*H04M 1/00*   (2006.01)
*H04M 3/42*   (2006.01)
*H04B 1/38*   (2006.01)
*H04B 1/40*   (2006.01)
*H04Q 11/00*  (2006.01)
*H04L 12/66*  (2006.01)

(52) U.S. Cl. .................. 455/565; 455/417; 455/557; 455/74.1; 370/260; 370/352

(58) Field of Classification Search .............. 455/550.1, 455/557, 558, 401, 420, 426.1, 426.2, 3.05, 455/417, 418, 422.1, 423, 74, 140.1, 74.1, 455/403, 404.1, 462, 565; 323/299; 370/260; 379/399.1
See application file for complete search history.

(56) References Cited

U.S. PATENT DOCUMENTS

| | | | | |
|---|---|---|---|---|
| 6,498,938 | B1 * | 12/2002 | Morrow, Sr. ................. | 455/557 |
| 6,999,761 | B2 * | 2/2006  | Bacon et al. ............... | 455/426.2 |
| 7,035,633 | B2 * | 4/2006  | Kirkpatrick ............... | 455/426.1 |
| 7,120,454 | B1 * | 10/2006 | Frank et al. ................ | 455/462 |
| 7,123,906 | B1 * | 10/2006 | Otterbeck et al. ......... | 455/422.1 |
| 7,130,609 | B2 * | 10/2006 | Cardina et al. ............ | 455/404.1 |
| 7,162,228 | B2 * | 1/2007  | Bleile et al. ................ | 455/418 |
| 7,194,083 | B1 * | 3/2007  | Tischer et al. ........... | 379/399.01 |
| 2001/0041533 | A1 * | 11/2001 | Schornack et al. ......... | 455/3.05 |
| 2004/0072544 | A1 * | 4/2004  | Alexis ....................... | 455/74.1 |

\* cited by examiner

*Primary Examiner*—Nay A Maung
*Assistant Examiner*—Paul P Tran
(74) *Attorney, Agent, or Firm*—Kun Ho Lie; Tahte Shih; Chin-Kun Lay

(57) ABSTRACT

A claimed utility box design that can be connected to a mobile phone with V.92 data modem function and a landline house telephone which is unsupported by local telephone service provider. The utility box houses a claimed circuit design to control signal currents for both in-coming and out-going phone calls, and a claimed controller program to utilize the data modem function of a mobile phone for making out-going phone call for voice communication. With this utility box, a mobile phone user can answer and make phone call on a connected house landline telephone set that is not supported by the traditional landline phone company service.

3 Claims, 5 Drawing Sheets

APPARATUS TO PROVIDE SIGNAL LINK BETWEEN MOBILE PHONE AND LANDLINE HOUSE TELEPHONE FOR VOICE COMMUNICATION

CROSS-REFERENCE

US Patent Documents
U.S. Pat. No. 4,658,096 Apr. 14, 1987 West et al.
U.S. Pat. No. 5,715,296 Feb. 3, 1998 Schornack et al.
U.S. Pat. No. 5,946,616 Aug. 31, 1999 Schornack et al.

STATEMENT REGARDING FEDERALLY SPONSORED RESEARCH OR DEVELOPMENT

The claimed invention is not sponsored by federal research and development grant.

BACKGROUND AND PRIOR ART

Description of the Prior Art

Existing products, such as Phonecell SX4e FWT for GSM 1900 and Phonecell SX4D Desktop phone for TDMA 800 manufactured by TELULAR Corp. and described in U.S. Pat. No. 5,946,616 issued on Aug. 31, 1999 and U.S. Pat. No. 5,715,296 issued on Feb. 3, 1998, focus on decoupling RF circuit loop and landline circuit loop on a fixed wireless telephone set. U.S. Pat. No. 4,658,096 issued to West et al. on Apr. 4, 1987 details an interface system for interfacing a telephone set with a RF transceiver as part of telephone network.

The fixed wireless telephone set design requires build-in RF components in order to receive and transmit RF signal to communicate with mobile phone service provider's land station. Therefore, the fixed wireless hardware requires frequent upgrade due to mobile service providers' frequency band changes and thus a range of fixed wireless telephone models are needed to work with wireless service providers' different mobile network systems, e.g., GSM, TDMA, and CDMA.

Users of fixed wireless telephone set are required to keep up with the costly hardware upgrade to replace outdated product in order to utilize newer services and better mobile phone quality provided by wireless service providers.

Patent application Ser. No. 10/669,410 filed on Sep. 25, 2003 (and published on Apr. 1, 2005) by Lie & Shih illustrates the design of a device to connect mobile phone incoming call to landline phone set. This design only routes mobile phone incoming call to landline telephone set, it does not provide the function needed to send out-going call initiated by caller using a landline telephone set through a connected mobile phone to a receiving party.

BRIEF SUMMARY OF THE INVENTION

This invention is for a utility box design that connects mobile phone and a landline telephone set. With this connection, a phone call into mobile phone can be answered on a connected landline telephone set through the analog voice signal route from mobile phone's headset plug for voice communication, or to make a phone call from the connected landline telephone set through the utility box and then to the data cable connection of the mobile phone's modem port for out-going call. With this arrangement, this invention transform mobile phone to the role of a communication gate of house telephone set for phone calls without the service support of local landline telephone provider. FIG. 1 illustrates the connection of this invention with mobile phone as well as the analog and the digital signal routes between the connected mobile phone and landline telephone set. The utility box remains as an independent utility box that is compatible with any mobile phone, which has data modem function similar to a V.92 PC modem, and from any mobile phone service provider.

The utility box that hosts the design is composed of three main components, as shown in FIG. 2, which are (A) One PCI (Peripheral Component Interconnect) voice card design, based on the design of U.S. patent application Ser. No. 10/669,410 filed by Lie and Shih on Sep. 25, 2003, to provide power to the landline telephone set and to route incoming call AC signal to landline telephone set;

(B) The Central Processor Unit, shown in FIG. 3, is composed of a low power processor, a RAM and a PCI controller that hosts a claimed controller program. The claimed controller program runs continuously when the utility box is powered up, and it processes three signals through serial port pins and sends command to the connected mobile phone to dial out-going call initiated from landline telephone set. The three signals are sent through three serial port pins. These pins are the RD (Receive Data) pin, the RTS (Ready to Send) pin, and the CTS (Clear To Send) pin. The first signal is a serial digital signal sent by DTMF (Dual Tone Multi Frequency) converter chip that receives the touchtone signals from landline telephone set. The controller program will then send the numbers to the connected mobile phone, through mobile phone's USB data cable connection, for making phone call. The second signal is a voltage signal sent by RVD (Impedance Variation Detector; a circuit design included in the mentioned patent application Ser. No. 10/669,410 by Lie and Shih) relay of the Current Control Unit through the CTS serial pin to command the controller program to send the third signal to a sensing relay in the Current Control Unit. The third signal is sent through the RTS pin and is used to prepare for voice communication between caller and receiver; and (C) One Current Controller Unit, shown in FIG. 4, controls the routing for in-coming and out-going phone calls to establish clear voice communication. There are four components in this unit, a DTMF converter chip and three solid-state logic relays. The DTMF chip can be of any commercially available DTMF converter that operates on 5V DC. And it is used to convert touchtone signal initiated from landline telephone set into a serial digital signal for the Central Processor Unit to make out-going phone call. The three solid-state relays are used as logic gate control device, and they are a sensing relay, a RVD relay, and a channel control relay. The sensing relay takes input signal from the RTS pin of the Central Processor Unit to send out a high (5V) or a low (0V) voltage current to the channel relay for communication path selection. The channel relay also takes a second high and low voltage inputs from the RVD relay and uses the combination of two voltage inputs to select proper communication path for touchtone signal routing and for voice (3.5V AC) communication. With the designed function of the channel relay in the Current Control Unit, the claimed utility box can also be connected to a fax machine for sending fax out.

As shown in the set-up diagram of FIG. 1, the main functions of the claimed utility box are (1) to provide 8V DC current needed for supporting landline telephone circuit and to connect mobile phone's incoming voice call with landline telephone set using a voice card design described in (A) above; and (2) to connect out-going phone call initiated on a landline telephone set to mobile phone through USB data cable connection. The claimed controller program stored in the Central Processor Unit will set the line at the correct communication route to allow clear voice communication on a connected landline telephone set which is not supported by local landline telephone company.

DESCRIPTION OF THE INVENTION

The claimed utility box is composed of three main components, (1) a voice card to transfer voice communication between mobile phone and landline telephone set; (2) a Central Processor Unit that hosts a controller program to send command to drive mobile phone data modem for out-going phone call; and (3) a Current Control Unit that uses a DTMF converter for touchtone signal to digital output conversion and solid-state relay to control AC current to selected signal path.

(1) The detail of the voice card design is included in a patent application filed by Lie and Shih on Sep. 25, 2003, USPTO application Ser. No. 60/669,410. It is not included for claims stated in this patent filing. The voice card provides an 8V DC current and a RVD voltage signal to the circuitry designs detailed in sections (B) and (C) stated above. The 8V DC current is needed to power the circuitry components in the Central Processor Unit and the Current Control Unit. The RVD voltage signal is an 8V DC output from a differential amplifier component in the RVD circuit unit of the voice card design. This 8V DC signal is activated when RVD detects line resistance variation from the lifting of the headset of the landline telephone set.

(2) The Central Processor Unit

The main functions of the Central Process Unit are for receiving dialed number of an out-going phone call and sending commands, by the claimed controller program, to the connected mobile phone to dial the call out. Another application for this unit is to send a 5V DC signal through the RTS pin to the sensing relay to control the OPEN or CLOSED status of the channel relay in the Current Control Unit. The claimed controller program reads the digital output, from the DTMF converter, originated from the touchtone numbers dialed by the landline telephone, in the Current Control Unit and processes the numbers through the USB data cable connection for calling out on a connected mobile phone with V.92 data modem functionality. The Central Process Unit also sends out a DC signal through the RTS pin of serial port to the sensing relay in the Current Control Unit by the claimed controller program after the program detect digital number input from the DTMF converter chip. The signal is a positive (+3V to +25V) voltage current and it activates the sensing relay to send out a 5V DC current to set the channel relay at CLOSED state in order to transfer the number strings through the Central Processor Unit to mobile phone for making out-going phone call. After a preset delay time of 18 seconds from the turn-on of the 5V DC current, the controller program will then send out a negative (−3V to −25V) voltage current to stop the sensing relay from sending out the 5V DC current output to the channel relay. A 0V output from the sensing relay will set the channel relay in an OPEN state to eliminate any background noise from entering the Central Processor Unit and thus create a clear voice communication path between caller and receiver.

Figure 1:
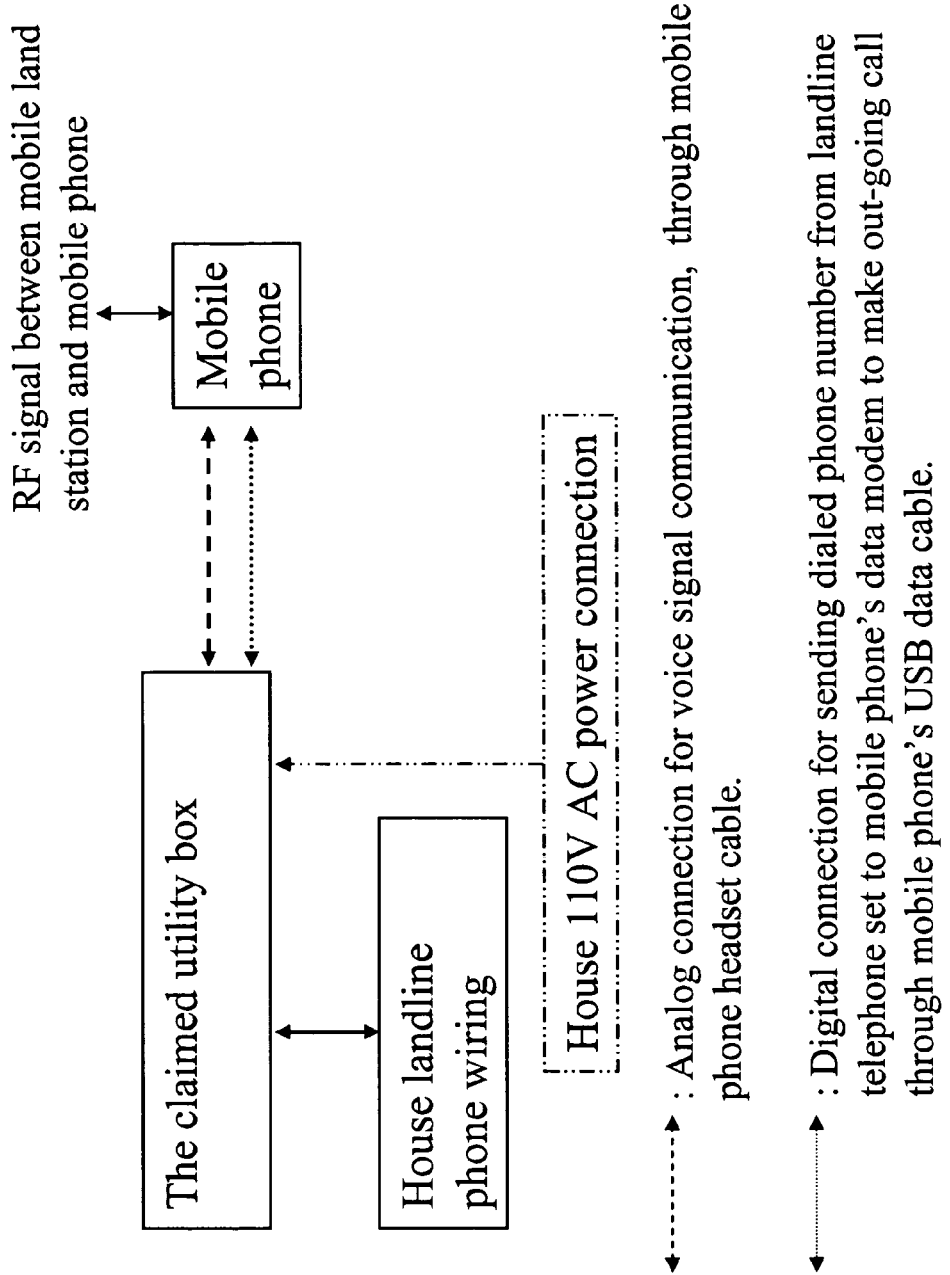
FIG. 1 Schematic diagram showing the connection of the utility box with mobile phone and landline telephone set which is unsupported by local telephone company.
Figure 2:
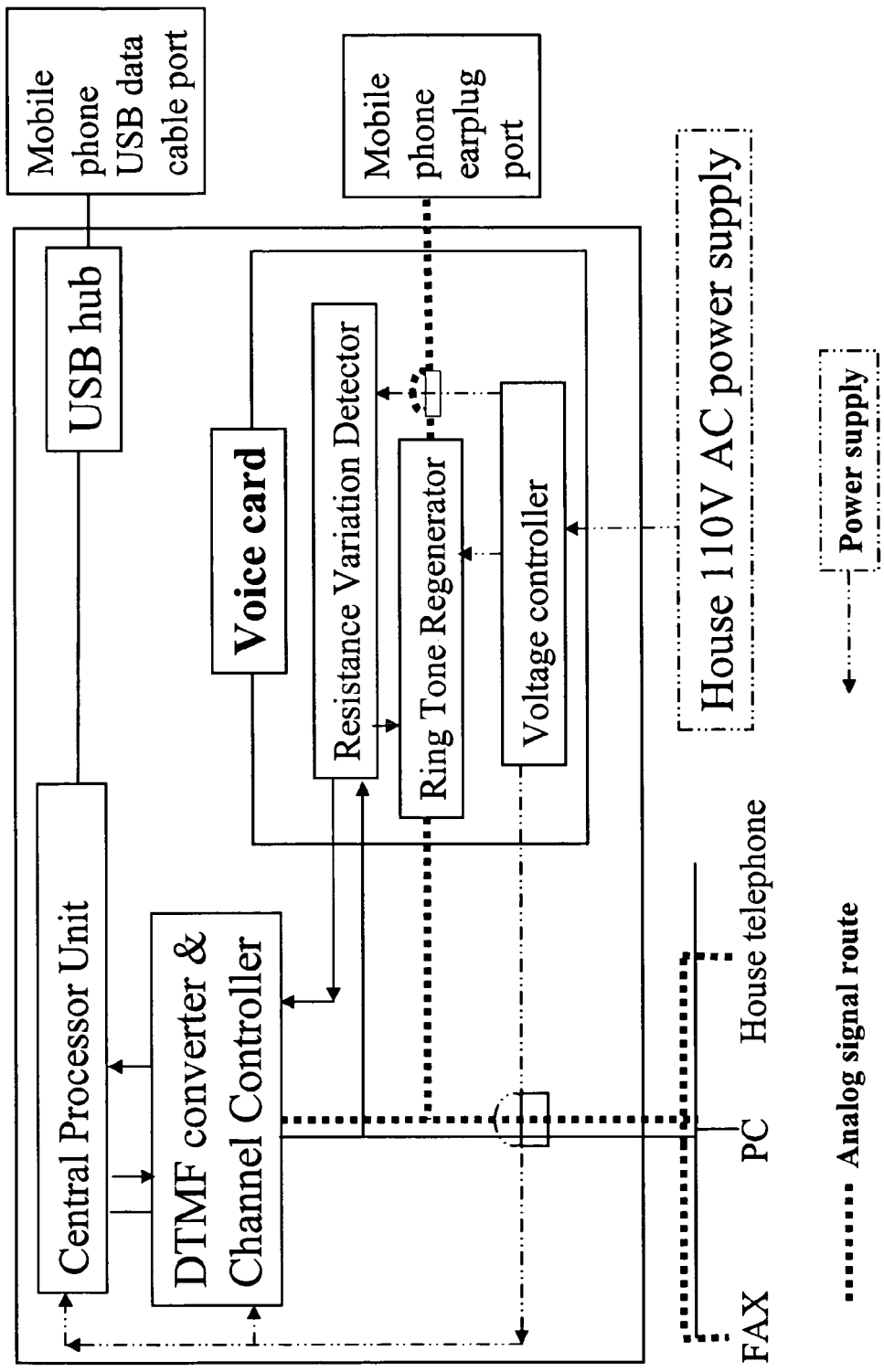
FIG. 2 Schematic of the three main components included in the utility box.
Figure 3:
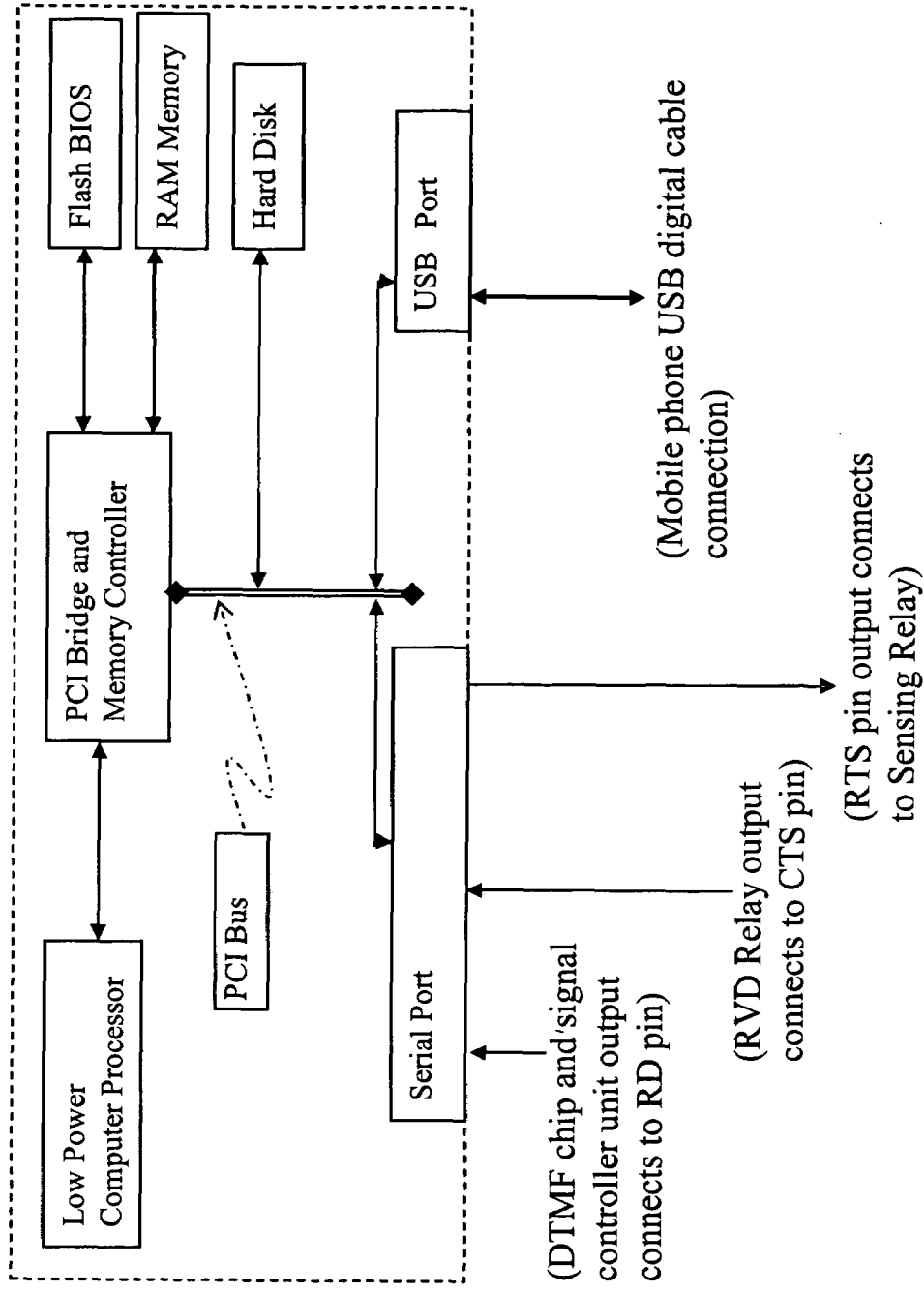
FIG. 3 The hardware architecture of the Central Processor Unit and the signal paths that connect to this unit.

The computer processor shown in FIG. 3 is a general-purpose low power microprocessor, similar to 68000 chipset. The PCI Bridge and Memory Controller is an integrated circuit that controls the PCI bus traffic and memory access. The flash memory contains BIOS (Basic Input/Output System) for the system boot up. The RAM Memory is where the claimed controller program is loaded and to be executed once the power supply to the claimed utility box is on. The Hard Disk stores the operating system, serial port and USB drivers, the dialing software and other necessary application programs. There are two interface ports used for dialing out a phone call, a serial port and a USB port. The serial port is connected to the Current Control Unit through which the user dialed touchtone signals are converted by a DTMF chip into serial digital signal and then sent to the Central Processor Unit. The USB port is connected to a mobile phone by USB data cable. The converted digital phone numbers are processed by the claimed controller program and then send to mobile phone through the USB cable to command the mobile phone for dialing-out a phone call.

There are four active pins in the serial port. The SD (Signal Ground) pin is for the electronic ground purpose. And three other pins are an RD pin, an RTS pin and a CTS pin. And they are used for interfacing with the Current Control Unit. The digital phone number received from the Current Control Unit is through the RD pin. The CTS pin is for receiving a DC current from the RVD unit of the voice card. A 5V DC current is send to the CTS pin when house telephone headset is picked up or a fax machine send mode is activated. The RTS pin is for sending signal to the sensing relay in the Current Control Unit. When digital output from DTMF converter is detected by the controller program, the RTS output signal is set to logic "High" (or Logic 1) first by the controller program to inform the sensing relay in the Current Control Unit that it is about to dialing out the first digit and starts to count down the 18 seconds delay time. After the 18 seconds delay time, the controller program then sets the RTS signal to logic "Low" (or Logic 0) state to command the sensing relay in the Current Control Unit to switch off (OPEN) path B, shown in FIG. 4, for clear voice communication through path A only. The serial port logic levels use +3 to +25 volts to signify the "High" (Logic 1) and −3 to −25 volts for a "Low" (Logic 0) states.

The Controller Software

This claimed controller program, developed to control outgoing phone call, starts execution when the system is powered up. It is always ready and on standby mode awaiting digital signal from the DTMF output. Once a set of 10 or 7-digit phone number is received, the claimed program inserts the phone number into the modem command that a V.92 compatible mobile phone modem can operate on. The strings of the modem command are then transmitted via the USB port to data cable and then to the mobile phone to dial the out-going phone call. The controller program also sends out a command to deliver +3V to +25V DC current through the RTS pin in the serial port to the sensing relay after it first detects the incoming digital number. The +3V to +25V DC current will be switched to −3V to −25V after 18 seconds delay, or an equivalent of 3 ring cycles' duration.

The claimed controller program is written in C language and it is submitted separately on the attached compact disc.

(3) The Current Control Unit

Figure 4:
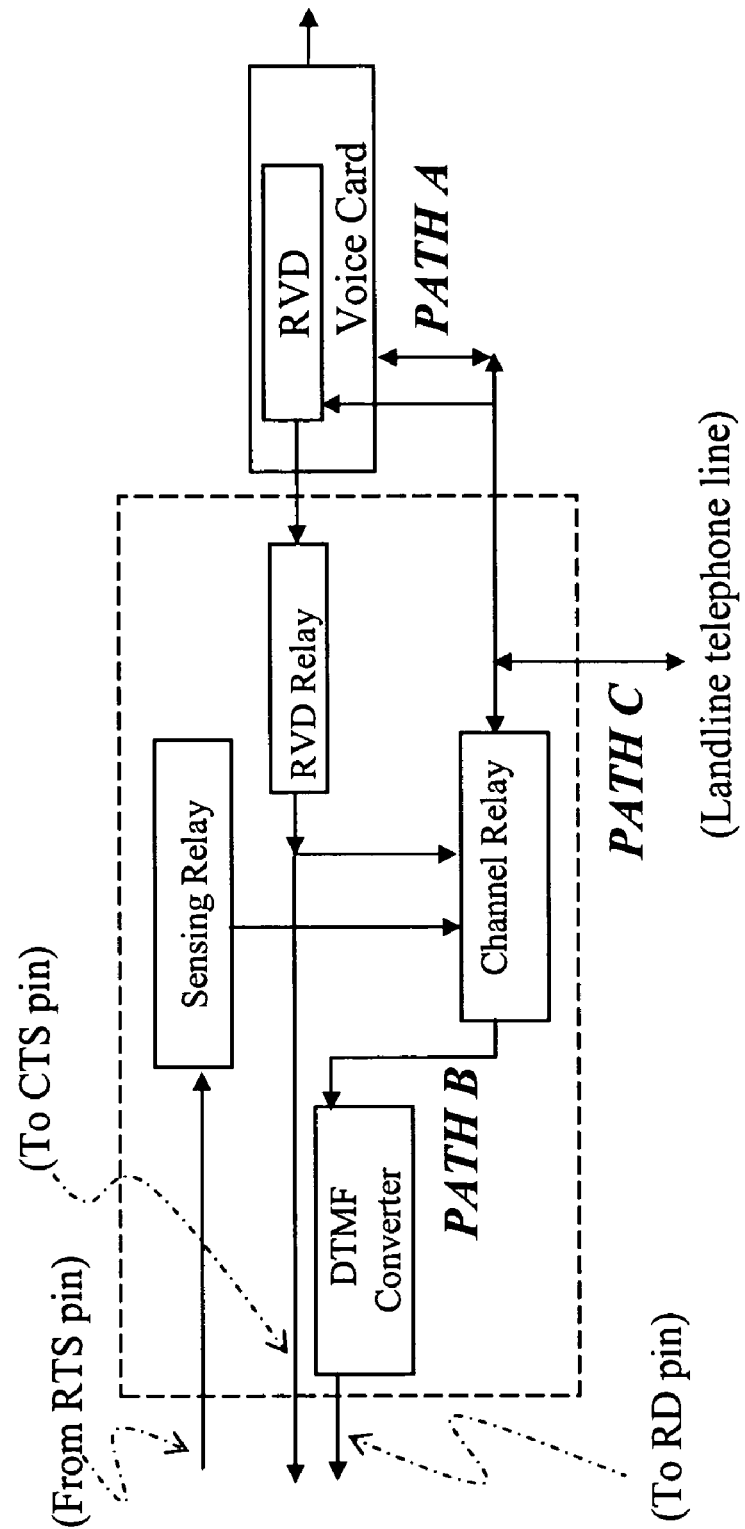
FIG. 4 The functional block diagram of Current Controller Unit and its connections to the RVD component of the voice card, the landline telephone set, and the serial port of the Central Processor Unit.

The two major functions of this unit are to convert the touchtone frequency into digital signal as input for the Central Processor Unit and to switch the digital signal channel between idle mode, dialing mode and voice/fax communication mode. As shown in FIG. 4, the design of this current control unit composes of four main components. The four components are a DTMF converter chip to convert touchtone frequency into digital signal, a sensing relay that send a high (5V) or low (0V) voltage signal to the channel relay, and a RVD relay that also sends a high or low voltage to the channel relay. The channel relay takes signal inputs from the RVD relay and the sensing relay to set the connectivity for path B. Table 1, shown at the end of this section, lists the state of the channel relay corresponding to the sequence of input signal voltage variations during in-coming and out-going phone calls. Notice how the RVD relay and sensing relay output combinations set the connectivity of the channel controller relay. With the channel controller relay in OPEN state, PATH A connects only to PATH C for voice/fax communication without any interference caused by voice or fax signal passing from PATH A onto PATH B and mistakenly taken in by the controller program in the Central Processor Unit to send out dialing command.

The DTMF chip can be of a commercially available chip that operates with 5V DC and converts touchtone frequency pulse, initiated from landline telephone set, into serial digital output through the RD pin for the claimed controller program in the Central Processor Unit to command mobile phone's data modem to dial out a phone call.

Figure 5:
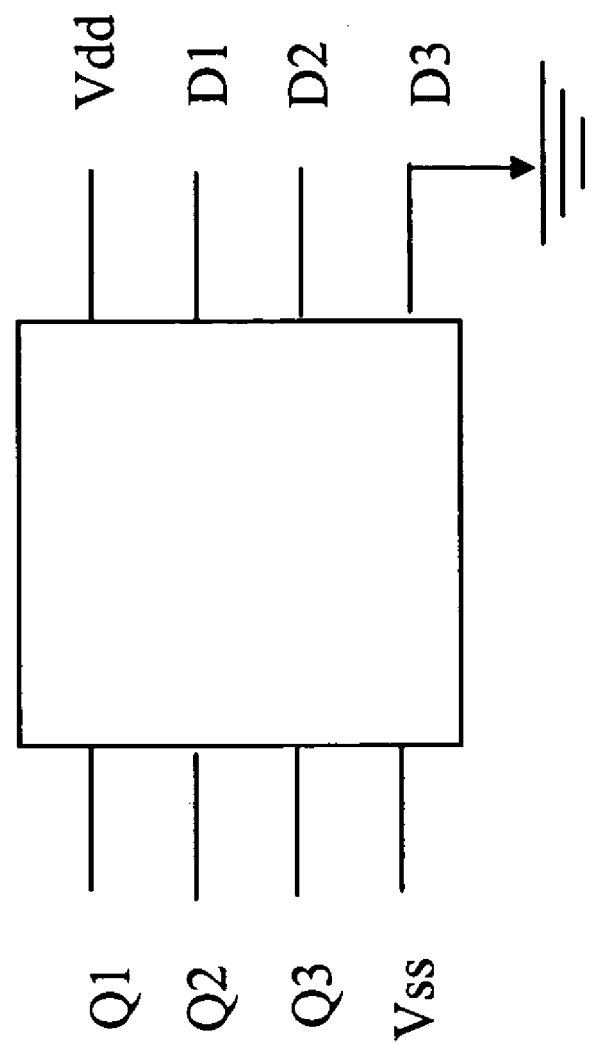
FIG. 5 The schematic of a solid-state relay.

A solid-state logic relay, as shown in FIG. 5, is used as the channel relay. Vdd and Vss are connected to a 5V power supply, a +5V DC for Vdd and −5V DC for Vss. The three data ports, designated as D1, D2, and D3, are connected to the sensing relay (D1), to the RVD relay (D2), and to electric ground (D3). The three terminals, designated as Q1, Q2, and Q3, are connected to PATH A/C (Q1), to PATH B (Q2), and to let float (Q3). An (0V, 5V) input combination to data ports (D1, D2) will set the relay to an OPEN state and thus terminate the passage of any incoming signal from terminal Q1, as indicated in Table 1. Other (D1, D2) input combinations keep the channel relay in CLOSED state and let signal from terminal Q1 to be passed on to terminal Q2.

The RVD relay is also a solid-state relay as shown in FIG. 5. It receives an 8V DC output signal from a differential amplifier component inside the RVD circuitry of the voice card design filed by Lie and Shih mentioned above. The 8V signal comes in through the data port D1, and then the relay sends out a 5V DC signal to both the channel relay and the CTS serial pin of the Central Processor Unit through terminal Q1. All other data ports and terminals of this relay are let to float except for data port D3 used for electric ground and Vdd/Vss for 5V DC power supply.

The sensing relay too is a solid-state relay as shown in FIG. 5. The input for this relay comes from the RTS serial pin of the Central Processor Unit through data port D1. A +3V to +25V DC signal from the RTS pin will trigger a +5V DC output signal from this relay through the terminal port Q1 to the channel relay. A −3V to −25V DC signal from the RTS pin will stop any signal being sent out to the channel relay through terminal Q1, and thus set a "Low" (0V) signal to the data port D1 of the channel relay.

TABLE 1

The state of the channel relay vs. input signals from sensing relay and RVD relay.

| Calling Status | Sensing Relay Output Voltage | RVD Relay Output Voltage | Channel Relay Status | Utility Box Status |
|---|---|---|---|---|
| IDLE | 0 V | 0 V | Closed | Idle |
| Voice/Fax IN-1 | 5 V | 5 V | Closed | Incoming phone rings; before call is answered |
| Voice/Fax IN-2 | 0 V | 5 V | Open | 18 seconds after call is answered and Calling Status changed to IN-1 |
| IDLE | 0 V | 0 V | Closed | Idle |
| IDLE | 0 V | 0 V | Closed | Idle |
| Voice/Fax OUT-1 | 5 V | 5 V | Closed | Handset picked up before dialing outgoing phone number |
| Voice/Fax OUT-2 | 0 V | 5 V | Open | 18 seconds after the 1st number is dialed and the Calling Status changed to OUT-2 |
| IDLE | 0 V | 0 V | Closed | Idle |

We claim:

1. An apparatus designed for connecting a mobile phone and a landline communication device, wherein the mobile phone is connected to a wireless communication system and the said landline communication device does not require local phone service, the said apparatus comprising:

a voice card module that regulates main AC power supply to deliver a desirable 8V DC power supply for the claimed apparatus, and to provide an analog signal path for routing voice signal between the connected landline communication device and the mobile phone earplug port; and a Central Processor Unit interfacing with a serial port or an USB port of the connected mobile phone to drive the mobile phone data modem for making outgoing phone call; and a DTMF converter and channel controller module that uses solid-state relay to interface with the said voice card module in order to correctly establish communication path between the said mobile phone and the said landline communication device wherein the channel controller module is comprised of three solid state relays, these three relays are:

(a) a RVD relay that receives an 8V DC signal from a connected voice card in order to send out a 5V DC current;

(b) a sensing relay that takes input signal from the RTS pin of the Central Processor Unit to send out a 5V voltage current to a channel relay; and (c) a channel relay that receives 5V or 0V DC current from both RVD relay and sensing relay to switch between OPEN and CLOSE states in order to isolate voice or fax path (PATH A) from command signal path (PATH B) to prevent mixing of analog voice signal and digital command signal.

2. A method for operating an apparatus designed for connecting a mobile phone and a landline communication device, wherein the said mobile phone is connecting to a mobile communication system and the said landline communication device does not require local phone service, the said method comprising:

a voice card module that regulates main AC power supply to deliver a desirable 8V DC power supply for the claimed apparatus, and to provide an analog signal path for routing voice signal between the connected landline communication device and the mobile phone earplug port; and a Central Processor Unit that hosts a controller program for sending command to a serial port or an USB port of the connected mobile phone in order to drive the connected mobile phone data modem for making outgoing phone call; and a DTMF converter and channel controller module that detects analog signal and uses solid-state relay to control analog signal from the said voice card module in order to correctly establish communication path between the said mobile phone and the said landline communication device, wherein the channel controller module is comprised of three solid state relays as logic gate control devices, these three relays are:

(a) a RVD relay that receives an 8V DC signal from a connected voice card in order to send out a 5V DC current;

(b) a sensing relay that takes input signal from the RTS pin of the Central Processor Unit to send out a 5V voltage current to a channel relay; and (c) a channel relay that receives 5V or 0V DC current from both RVD relay and sensing relay to switch between OPEN and CLOSE states in order to isolate voice or fax path (PATH A) from command signal path (PATH B) to prevent mixing of analog voice signal and digital command signal with a logic control sequence, implemented on the said channel relay, described in (c); wherein the said channel controller module utilizes the logic control sequence to control analog signal from the said voice card module in order to correctly establish communication path between the said mobile phone and the said communication device, and utilizes various combinations of a first DC current signal sent out by the said RVD relay, described in (a), and a second DC current signal sent out by the said sensing relay, described in (b), in order to set the state of the said channel relay to an OPEN state or CLOSE state; wherein the OPEN state is set when the said first DC current from the said RVD relay and the said second DC current from the said sensing relay are at different DC voltages as in one of the following combinations: (i) 5V for the said first DC current and 0V for the said second DC current; or (ii) 0V for the said first DC current and 5V for the said second DC current; and wherein the CLOSE state is set when the said first DC current from the said RVD relay and the said second DC current from the said sensing relay are at the same DC voltage of 0V or 5V at the same time.

3. A method for operating an apparatus designed for connecting a mobile phone and a landline communication device as in claim 2, wherein the Central Processor Unit sends commands to the connected mobile phone via either the serial port or the USB port of the said mobile phone data modem for making outgoing phone call; and after receiving by the Central Processor Unit a string of dialed digital numbers sent from the DTMF converter through the RTS pin of a serial port to the said sensing relay and upon a preset time delay of first sending a +3V to +25V DC current, the Central Processor Unit sends a −3V to −25V DC current to stop the said sensing relay from sending a 5V DC current in order to set the said channel relay to an OPEN state to eliminate possible background circuitry noise signal to be heard by both caller and receiver.

* * * * *